March 16, 1948.　　　M. S. ADLER　　　2,437,802
ELECTRICAL WALL OUTLET
Filed May 13, 1946　　　2 Sheets-Sheet 1
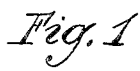
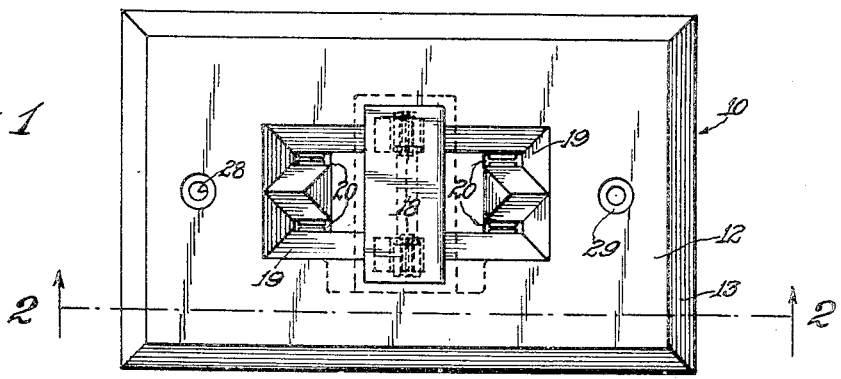
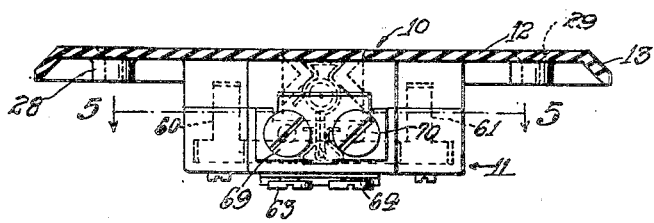
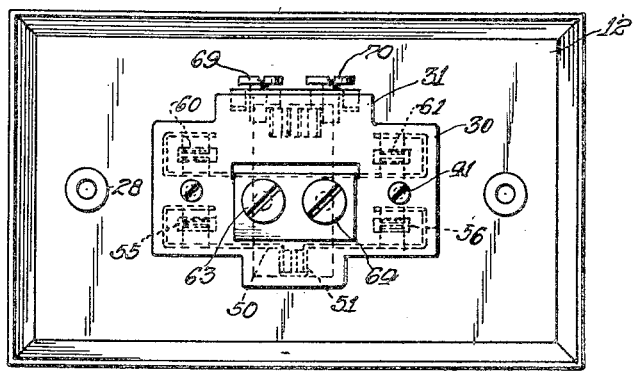
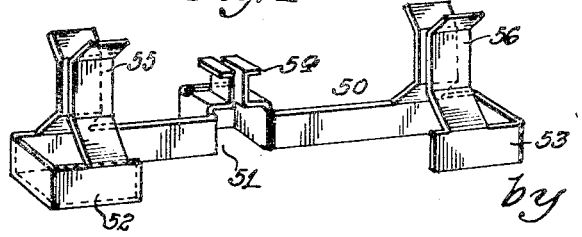
Inventor
Melvin S. Adler
by Harry Bleak
Attorney.

March 16, 1948.  M. S. ADLER  2,437,802
ELECTRICAL WALL OUTLET
Filed May 13, 1946  2 Sheets-Sheet 2
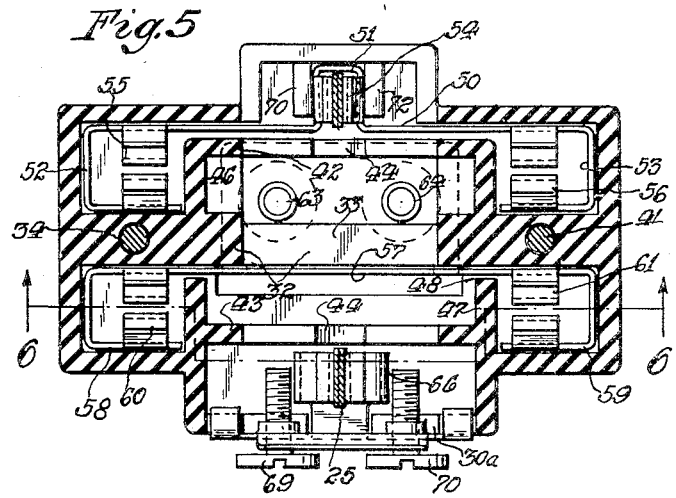
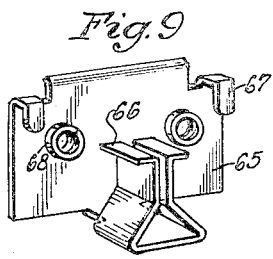
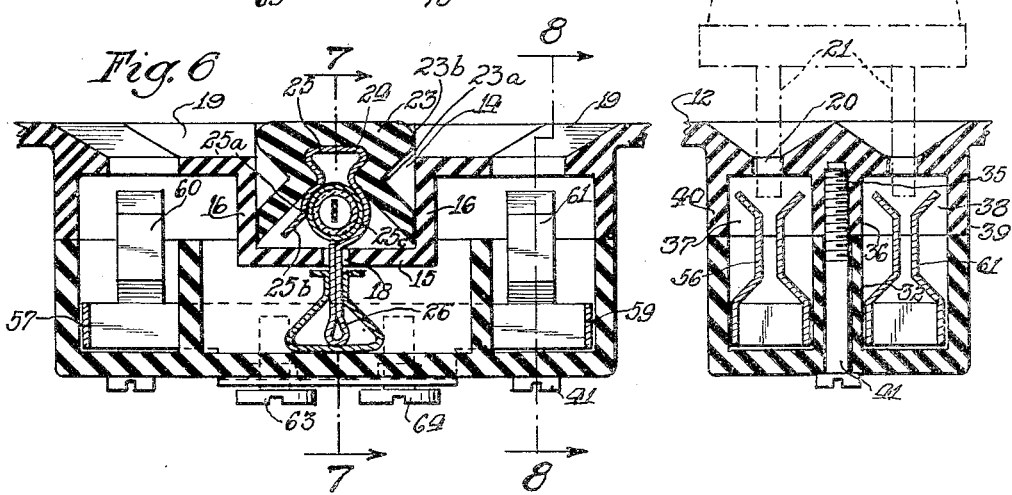
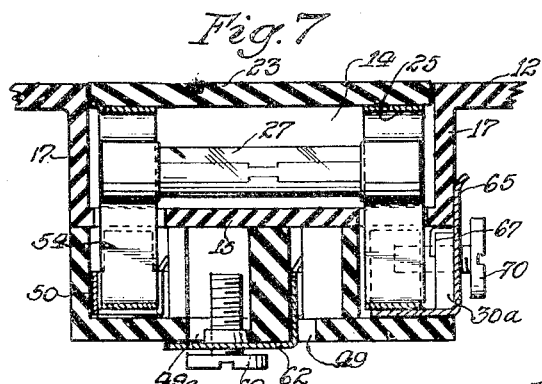
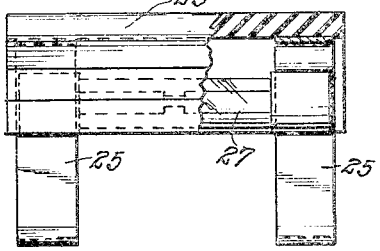
Inventor
Melvin S. Adler
by Henry Heck
Attorney.

Patented Mar. 16, 1948

2,437,802

UNITED STATES PATENT OFFICE 2,437,802

ELECTRICAL WALL OUTLET

Melvin S. Adler, Chicago, Ill.

Application May 13, 1946, Serial No. 669,261

2 Claims. (Cl. 200—115.5)

1

The invention relates to electrical wall outlets of the kind where a plate having two pairs of plug receiving openings is provided on a wall or in a recess therein affording simultaneous connection of two electrical appliances or lamps to a circuit.

It is an object of the invention to provide a wall outlet where a single fuse controls the current flowing to two current consuming devices without, however, interrupting the remainder of the circuit.

It is a further object to provide a wall outlet having a single removable fuse in a recess of the face of the outlet which fuse only controls the current consuming devices attached to the outlet.

It is a further object to provide a wall outlet made of two sections and removably secured together, the outer section having a fuse flush with the contour of said section, the inner section having the electrical connections which upon securing the sections together provide the fuse in series with the circuits of two electrical devices attached to the outlet.

It is also an object to provide certain features of construction and arrangement of parts tending to enhance the reliability, efficiency and utility of devices of the kind specified.

With these and other objects in view which will become apparent from a perusal of the invention, the latter comprises the means described in the following specification, particularly pointed out in the claims forming a part thereof, and illustrated in the accompanying drawings, in which Fig. 1 is a top plan view of the wall outlet constructed in accordance with my invention.

Fig. 2 is a section on the line 2—2 of Fig. 1.

Fig. 3 is a bottom plan view.

Fig. 4 is a perspective view of a pair of contacts and connecting links.

Fig. 5 is an enlarged section on the line 5—5 of Fig. 2.

Fig. 6 is a section on the line 6—6 of Fig. 5.

Fig. 7 is a section on the line 7—7 of Fig. 6.

Fig. 8 is a section on the line 8—8 of Fig. 6.

Fig. 9 is a perspective view of a terminal plate formed with contacts for one of the fuse clips, and Fig. 10 is a side elevational view of the fuse and its carrier with parts broken away to disclose interior construction.

The wall outlet is composed of two parts, an outer section generally designated by 10 and inner section 11, which sections are designed to fit together and to be secured to one another.

The outer section 10 is made of any desired insulating or plastic material and comprises a rectangular plate 12 which is beveled at the edges as at 13 to enhance its appearance. The plate 12 is formed with an inwardly extending chamber 14 elongated in transverse direction and open at the top for the insertion of a fuse, as will be hereinafter further explained.

The chamber has a bottom wall 15 side walls 16 and end walls 17 (Fig. 7). The bottom wall has two elongated openings 18 in transverse alignment adjacent to the chamber at each side thereof is a depressed rectangular portion 19 (Fig. 6) having sloping walls and each provided with a pair of slotted openings 20 through which the prongs 21 of a plug 22 are inserted.

A fuse carrier 23 of insulating material (Fig. 6) has a dovetailed groove 24 co-extensive with the carrier in which is received at each end a spring 25 bent to fit in the groove 24. The part protruding from the groove to the left as viewed in Fig. 6 is formed with an arcuate portion 25a and a straight terminal portion 25b. The right part is also provided with an arcuate portion 25c and continues on downwardly and is folded upon itself as at 26 and terminates short of the arcuate portion 25c. Each spring 25 constitutes a clip for a fuse 27 which is held in place by the springs 25.

The carrier 23 is formed at each side with a V-shaped longitudinal groove 23a and at the top with an arcuate edge 23b which can be easily grasped when the carrier and fuse are to be removed since the chamber 14 affords easy access to the edge 23b.

The plate 12 is provided with integral tubular members 28 whose bores communicate with countersunk openings 29 in the plate 12 for the insertion of the screws to secure the plate to the wall.

From the foregoing it is evident that the outer section 10 does not contain any electrical contacts or connections, except the fuse and the retaining means therefor and is provided with pairs of openings 20 through which the plug is inserted.

The inner section 11 is in the form of a casing 30 made of insulating or plastic material of rectangular form but wider at the center as at 31 and fits onto the chamber 14 and the lateral depressions 19 so as to form extensions thereof.

The casing 30 is formed with a longitudinal central partition 32 which is of less height at the center as at 33 than the remainder of the partition. The central partition 32 is formed with holes 34 which are in alignment with holes 35 (Fig. 8) in a partition 36, at the center of each depressed portion 19 and extending therebelow to provide separate chambers 37 and 38 in conjunction with flanges 39 and 40 (Fig. 8) extending downwardly from the plate 12. Screws 41 when inserted in the openings 34 and 35 serve to hold the sections 10 and 11 together.

Parallel to the central partition 32 are partitions 42 and 43 which are provided with a slot 44 (Fig. 5). The partitions 42 and 43 are connected by cross walls 46 and 47 to the main partition 32. However, the cross walls 47 stop short of partition 32 to provide slots 48.

The end wall of the wider portion 31 at the right side of the casing 30, as viewed in Fig. 7 is partly cut away as at 30a, and the bottom of the casing is provided with an elongated slot 49 and spaced therefrom with a rectangular opening 49a.

In the chamber afforded by the casing wall the partitions 32 cross wall 46 and partition 42 are inserted the electrical contacts and a link or connector shown in detail in Fig. 4.

The link or connector 50 is bent into U-form at its center as at 51 and is bent also into U-form at the ends 52 and 53. Contacts 54 are formed integral with the U-portion 51 and contacts 55 and 56 are formed integral with the U-portions 52 and 53 respectively.

In the chamber defined by the casing wall, partition 32 and cross wall 47 is inserted a connector 57, the slots 48 affording the necessary clearance.

The connector 57 is bent into U-shaped ends 58 and 59 which are respectively formed with integral contacts 60 and 61.

The connector 57 is also formed integral with a terminal plate 62 (Fig. 7) extending through the slot 49 and bent at right angles to underlie the bottom of casing 31. Terminal screws 63 and 64 are secured to the terminal plate 62.

A terminal plate 65 is formed with integral contacts 66 and has lugs 67 stamped therefrom to clamp the plate 65 to the right end wall of casing 31 as viewed in Fig. 7. The plate 65 has bushings 68 to receive terminal screws 69, 70.

The central U-shaped portion 51 of connector 50 is received between ledges 71 and 72 (Fig. 5) to provide for a tight fit.

The fuse clips 25 when the sections 10 and 11 are secured together are received in the contact springs 54 and 66 and are inserted in with the circuits established by the plugs 22 when inserted in the openings 20 and received by the contacts 55, 60 and 56, 61.

The circuits may be traced as follows: A feed wire (not shown) is connected to the terminal 63 and current flows from the terminal plate 62 to connector 57 to contact 60 and 61 thence through the plug established circuits back to contacts 55 and 56 through connector 50 to contact 54 through fuse 27 to contact 66 on terminal plate 65 and through terminal 69 to the wire (not shown) connected thereto.

It is clear that the current consuming devices when plugged in the outlet are connected in series with the fuse 27 which, however, only controls the plugged-in devices and does not effect the remainder of the circuit in which the outlet is connected, as formed by the feed wires.

The wall outlet as described prevents, therefore, that the entire circuit is rendered useless when one or both of the plugged-in devices cause the fuse to be blown.

In view of the fact that the fuse 27 is insertible through the face plate 12 it may be easily exchanged when blown without requiring the services of an electrician.

The terminals 64 and 70 are provided in the event a second wall outlet is to be connected to the outlet 10, 11.

The drawings disclose one embodiment of the invention but numerous changes and alterations may be made without departing from the spirit of the invention.

I, therefore, do not limit myself to details of construction and arrangement of parts as shown, but wish to include all modifications and revisions which fall within the scope of the invention as defined in the appended claims.

I claim:

1. A wall outlet, including a face plate having a longitudinally extending shallow depressed portion of rectangular cross section at the outer face thereof, a chamber of rectangular cross section extending transversely of said plate and underneath thereof opening into said depressed portion, a casing secured to said face plate, two pair of contacts in said casing, a pair of links connecting corresponding contacts of each pair, one of said links having a spring contact intermediate its ends, a terminal plate on said outlet connected with one of said links, and provided with a spring contact, a second terminal plate secured to said outlet, and a fuse carrier in said chamber extending with spring clips into engagement with the spring contacts of said link and terminal plate, said fuse carrier having its outer face flush with the outer face of said face plate.

2. A wall outlet, including a face plate having a longitudinally extending shallow depressed portion of rectangular cross section at the outer face thereof, a chamber of rectangular cross section extending transversely of said plate and underneath thereof opening into said depressed portion, a casing secured to said face plate, two pair of contacts in said casing, a pair of links connecting corresponding contacts of each pair, one of said links having a spring contact intermediate its ends, a terminal plate on said outlet connected with one of said links, and provided with a spring contact, a second terminal plate secured to said outlet, and a fuse carrier having a dovetailed groove for the reception of a fuse clip holding a cartridge fuse, said carrier being provided with longitudinal grooves each side to provide edges for convenient seizure and having its outer face flush with the outer face of said face plate.

MELVIN S. ADLER.

REFERENCES CITED

The following references are of record in the file of this patent:

UNITED STATES PATENTS

| Number | Name | Date |
| --- | --- | --- |
| 1,726,429 | Ferris | Aug. 27, 1929 |
| 1,926,001 | Goodridge | Sept. 5, 1933 |
| 2,039,336 | Niesen | May 5, 1936 |
| 2,151,555 | Kimball | Mar. 21, 1939 |
| 2,256,716 | Klancnik | Sept. 23, 1941 |
| 2,265,233 | Jackson et al. | Dec. 9, 1941 |